(12) United States Patent
Royz et al.

(10) Patent No.: US 7,443,402 B2
(45) Date of Patent: Oct. 28, 2008

(54) METHOD AND APPARATUS FOR VIRTUAL WALKTHROUGH

(75) Inventors: Gadi Royz, Tel-Aviv (IL); Rony Amira, Modi'in (IL)

(73) Assignee: MentorWave Technologies Ltd., Herzliya (IL)

( * ) Notice: Subject to any disclaimer, the term of this patent is extended or adjusted under 35 U.S.C. 154(b) by 369 days.

(21) Appl. No.: 10/535,887

(22) PCT Filed: Nov. 24, 2003

(86) PCT No.: PCT/IL03/00990

§ 371 (c)(1),
(2), (4) Date: May 23, 2005

(87) PCT Pub. No.: WO2004/049263

PCT Pub. Date: Jun. 10, 2004

(65) Prior Publication Data

US 2006/0033741 A1  Feb. 16, 2006

Related U.S. Application Data

(60) Provisional application No. 60/428,699, filed on Nov. 25, 2002.

(51) Int. Cl.
*G06T 13/00* (2006.01)
*G06T 15/70* (2006.01)
(52) U.S. Cl. .................. 345/474; 345/959; 345/473
(58) Field of Classification Search .......... 345/473–475
See application file for complete search history.

(56) References Cited

U.S. PATENT DOCUMENTS

| | | | | |
|---|---|---|---|---|
| 5,644,694 A | * | 7/1997 | Appleton | 345/474 |
| 5,816,823 A | * | 10/1998 | Naimark et al. | 434/307 R |
| 5,917,495 A | * | 6/1999 | Doi et al. | 345/419 |
| 6,496,186 B1 | * | 12/2002 | Deering | 345/419 |
| 6,549,215 B2 | * | 4/2003 | Jouppi | 345/660 |
| 6,724,384 B2 | * | 4/2004 | Weingarten | 345/426 |
| 6,781,606 B2 | * | 8/2004 | Jouppi | 345/698 |
| 6,856,314 B2 | * | 2/2005 | Ng | 345/421 |
| 6,968,973 B2 | | 11/2005 | Uyttendaele et al. | |
| 7,027,049 B2 | * | 4/2006 | Aliaga et al. | 345/427 |

(Continued)

OTHER PUBLICATIONS

Chen, Shenchang E.; "QuickTime® VR—An Image-Based Approach to Virtual Environment Navigation;" 1995; ACM; pp. 29-38.*

(Continued)

*Primary Examiner*—Kee M. Tung
*Assistant Examiner*—Crystal Murdoch
(74) *Attorney, Agent, or Firm*—Marsteller & Associates, P.C.

(57) ABSTRACT

Method for producing an interactive virtual movie, which simulates walking of a user within a real site, comprising: (a) Defining first minimal conditions: (b) Defining second minimal conditions; (c) Moving a scanning apparatus along routes within the site, measuring the x,y, displacement, and angular orientation of the scanning apparatus at any given time, and creating a new node at least whenever such first minimal conditions are met; (d) Obtaining an image data at each node location reflecting a camera unit field of view, and associating the image data and its orientation with the x,y. coordinates of the present node; (e) Finding and registering neighborhood links between pairs of nodes, each link satisfies at least said second minimal conditions; and (f) Further associating with each created link an exit angular orientation and entry angular orientation to nodes of each pair.

15 Claims, 13 Drawing Sheets

U.S. PATENT DOCUMENTS

| | | | | |
|---|---|---|---|---|
| 7,058,896 B2* | 6/2006 | Hughes | ............ | 715/757 |
| 2002/0063726 A1* | 5/2002 | Jouppi | ............ | 345/660 |
| 2002/0105529 A1* | 8/2002 | Bowser et al. | ............ | 345/629 |
| 2002/0113805 A1* | 8/2002 | Li et al. | ............ | 345/649 |
| 2002/0171645 A1* | 11/2002 | Weingarten | ............ | 345/423 |
| 2002/0171647 A1* | 11/2002 | Sterchi et al. | ............ | 345/473 |
| 2003/0090487 A1* | 5/2003 | Dawson-Scully | ............ | 345/473 |
| 2004/0032410 A1* | 2/2004 | Ryan | ............ | 345/427 |
| 2004/0046760 A1* | 3/2004 | Roberts et al. | ............ | 345/474 |
| 2005/0052462 A1* | 3/2005 | Sakamoto et al. | ............ | 345/473 |

OTHER PUBLICATIONS

Miller, Gavin et al.; "The Virtual Museum: Interactive 3D Navigation of a Multimedia Database;" 1992; The Journal of Visualization and Computer Animation; vol. 3; pp. 183-197.*

Fleishman S et al: "Navigating Through Sparse Views", Dec. 20, 1999, XP000977119.

Darsa L et al: "Walkthrough of complex . . . simplification", Feb. 25, 1998, XP004123426.

Yan-Fai Chan et al: "A panoramic-based . . . photos", Oct. 5, 1999, XP010359469.

* cited by examiner

METHOD AND APPARATUS FOR VIRTUAL WALKTHROUGH

FIELD OF THE INVENTION

The field of the invention relates to systems and methods for the preparation of interactive movies. More particularly, the invention relates to a method and system for producing an interactive movie, which is made particularly for the purpose of enabling a user to virtually travel within a physical site, such as a building, office, etc.

BACKGROUND OF THE INVENTION

Virtual movies are widely used for a variety of purposes, such as exhibitions, remote guidance and touring of places, education, training, electronic games, etc. Some of such movies are animated, and some others are real, in the sense of involving real frames that are photographed within a real, physical site. The present invention relates to the latter case, i.e., to the case where the preparation of a virtual and interactive movie enables a user to explore a real site.

For example, there are some cases in which it is desired to allow a user to watch a movie of a site, and navigate interactively within the site. More particularly, it is desired to have an interactive movie enabling the user to navigate within the site while walking to any possible direction he selects, while continuously watching actual images of the site, that may be optionally combined with computer generated interactive or non interactive events or objects.

In another, more particular example, it is desired to provide a virtual interactive movie for training individuals and to familiarize them with a specific site, while providing them with essential and comprehensive information about the site such as its layout, its appearance, location of rooms and equipment therein. Moreover, it could be beneficial to combine in the movie some simulations, for example, a fire when training them how to deal with some emergency procedures.

Such virtual interactive movies that enable people to navigate within a real site can also be used for marketing purposes, for example, allowing viewers to interactively explore sites such as real estate properties, hotels, etc.

Currently, the preparation of a virtual, interactive movie which enables navigation within a site is a very complicated task, and it involves a substantial effort, requiring professional and lengthy filming and editing.

Also, the results are generally not so satisfactory, being far from providing to the user a real feeling.

It is one object of the present invention to provide a method and system which significantly simplify the preparation of such virtual and interactive movies which comprise images of a real site.

It is another object of the present invention to enable automation of at least a significant part of the preparation of such virtual and interactive movies.

It is still another object of the present invention to enable production of such a film by freely moving a scanning apparatus within the site, without accuracy limitations which require the providing of accurate marks within the site.

It is still another object of the present invention to provide a linked, diagram based representation of the virtual-interactive movie.

Other objects and advantages of the invention will become apparent as the description proceeds.

SUMMARY OF THE INVENTION

The present invention relates to method for producing an interactive virtual movie, which simulates the walking of a user within a real site and exploring the same, comprising the steps of (a) Defining first minimal conditions for the creation of a new node; (b) Defining second minimal conditions for linking between nodes; (c) Moving a scanning apparatus along routes within the site, measuring the x,y, displacement coordinates, and angular orientation of the scanning apparatus at any given time, and creating a new node at least whenever such first minimal conditions are met; (d) Obtaining an image data at each node location reflecting a camera unit field of view, and associating the said image data and its orientation with the x,y, location coordinates of the present node; (e) Finding and registering neighborhood links between pairs of nodes to generally create chains of nodes, each link assignment connecting between any two nodes satisfies at least said second minimal conditions required for linking between nodes, wherein more than one link may be assigned to a node; (f) Further associating and registering with each created link an exit angular orientation from a first node in the pair and entry angular orientation to the second node in the pair.

Preferably, the satisfying any one of the conditions included in said first minimal conditions will result in the creation of a new node.

Preferably, one of said first minimal conditions is a maximal predefined displacement D between two nodes sampled by the apparatus.

Preferably, one of said first minimal conditions is a maximal predefined allowed angular change $\delta°$ in the orientation of the apparatus after leaving a node.

Preferably, the method further comprises the elimination or merging of nodes when some third conditions are met;

Preferably, said third conditions comprise closeness of nodes below a predefined distance d, and a 360° in at least one of the nodes.

Preferably, each image data comprises a plurality of frames, and wherein each frame angular orientation is also registered.

Preferably, the interactive virtual movie comprises: (a) A plurality of nodes;
(b) Links connecting between nodes, wherein with each link between two nodes is associated with an exit angular indication from one node, and an entry angular indication to the other node, plurality of links may be associated with one node; (c) Image data reflecting a camera unit field of view for each node, and orientation indications for said image data;

Preferably, the display of the movie comprises the steps of: (a) Providing to the user with means for selecting, turning, and advancing; (b) Displaying to the user a selected user field of view within the image data of a node; (c) When the user turns to a specific direction, displaying to the user the user field of view portion of the image data which corresponds to said specific direction; (d) When the user directs to one of the exit directions of the present node, and chooses to advance: displaying to the user a portion of the image data of the next node linked to said present node by said exit direction, said displayed portion of the image data corresponds to the entry direction associated with said link. (e) When the user selecting a node other than the present node, displaying to him a user field of view portion of the image data of said other node.

The present invention also relates to an apparatus for producing an interactive virtual movie, which simulates the walking of a user within a real site, said apparatus comprises: (a) A movable platform; (b) Position and orientation unit for obtaining at any given time position and orientation of the platform, and providing the same to an imaging unit; (c) Imaging units for creating a node any time when some first minimal conditions are met, obtaining image data, and associating said image data and its orientation with the node location, thereby forming a node package; (d) Data unit for: (1) receiving node packages from the imaging unit; (2) calculating neighborhood between nodes; (3) registering links between found neighboring nodes, including registering for each link entry and exit directions to and from nodes; (4) calculating possible merging and/or eliminating of nodes; (5) saving in a database within the data unit a linked graph which is the result of steps 1-4; (6) importing linked graph/s from removable media or network device to the database; and (7) exporting linked graph/s from the database to a removable media or a network device. (e) A control unit for: (1) Activation and deactivation of the device; (2) Defining parameters necessary for the operation of the apparatus; (3) Providing control over the import and export operations.

Preferably, the data unit is located on the movable platform;

Alternatively, the data unit may be located away from the platform;

DETAILED DESCRIPTION OF PREFERRED EMBODIMENTS

The filming of the virtual movie according to the present invention is preferably made by means of a scanning apparatus. The scanning apparatus includes a camera unit which may comprise one or more individual cameras, each may be a video digital or analog camera, or digital stills camera. The camera unit can automatically scan and obtain an image data (hereinafter frames) in up to 360° of a field of view. The camera unit field of view may be obtained by combining one or more individual frames.

As said, it is an object of the invention to enable the user viewing the movie to explore the scanned site, and to let him choose his way in real time, meaning that, for example, when approaching a junction, letting him decide which path to choose. According to the present invention video or still frames are captured along routes in the real site. The captured frames are then processed in a generally automated manner to produce an interactive movie. Then, when the movie is activated, the user can virtually explore the site while moving along said virtual routes. The filming, and the preparation process of the virtual movie is very simple, as it does not require the performing of complicated preparations in the site, such as the accurate marking of filming spots on the site's floor or the marking of accurate lines along which the scanning apparatus must be directed. The prior art does require such markings (in the form of spots, or wires), that are not allowed to appear in the filmed frames or will make the filming process unwieldy or expensive.

Figure 1:
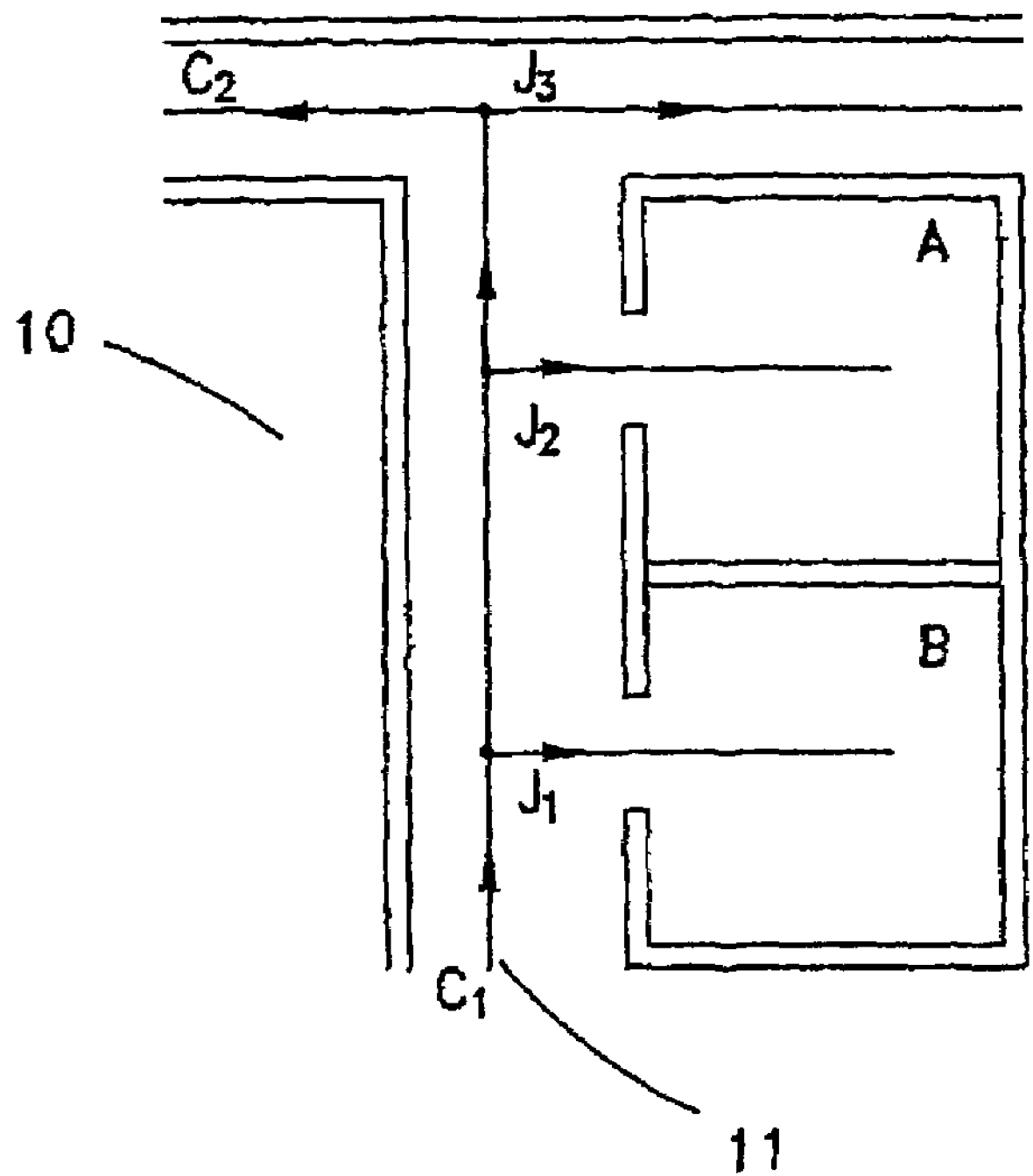
FIG. 1 shows a scheme of an exemplary office having two corridors and two rooms, exploration of which has to be provided by means of an interactive movie.

FIG. 1 shows a scheme of an example of an office 10 having two corridors (C1, C2) and two rooms (A, B). An object of the present invention is to produce a virtual movie enabling a user to navigate, i.e., to "walk" around the office. As seen, while beginning at point 11, the user walks up to junction J1, in which he may either turn right into room B or continue straight ahead. Similarly, when arriving at junction J2, the user may either turn right into room A or go straight ahead along corridor C1. When arriving at junction J3, the user may either turn to the right or to the left within corridor C2. Moreover, while walking along the corridor the user generally needs to have a relatively limited field of view. In junctions J1, J2, and J3 the user needs a wider field of view, and in rooms A and B he generally needs a field of view of 360°. For example, in junction J1 the user may select to continue along the corridor and view up to the end of the corridor, or he may select turning into room B and see the view of room B, or he may even in some cases decide to turn back and return along the corridor C1.

According to the present invention the office is filmed by means of a scanning apparatus which can take frames in up to a 360° field of view. The scanning apparatus is moved forward along the route, while capturing photographs in a relevant field of view, from filming spots. For example, the scanning apparatus may capture images every distance of 10 cm. and scan a predefined field of view, by capturing frames.

Figure 2:
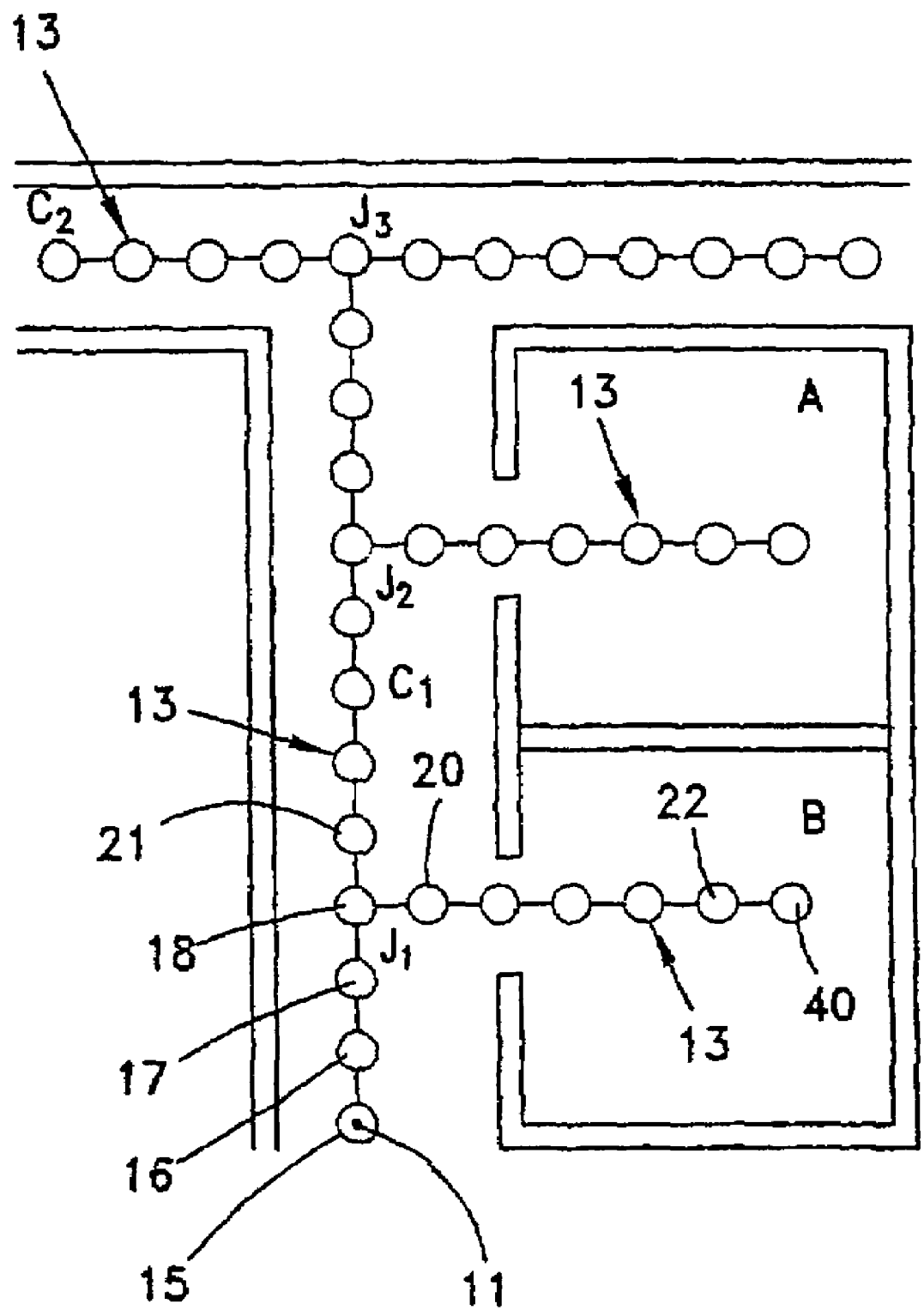
FIG. 2 shows an example for a partial scheme with routes and nodes marked on it.

The plurality of points along the route in which the scanning (filming) is performed are indicated in FIG. 2 as nodes 13. The nodes 13, schematically indicate in each specific node location the manner of scanning at that point, and provide other parameters that are specific to this node.

Figure 3A:
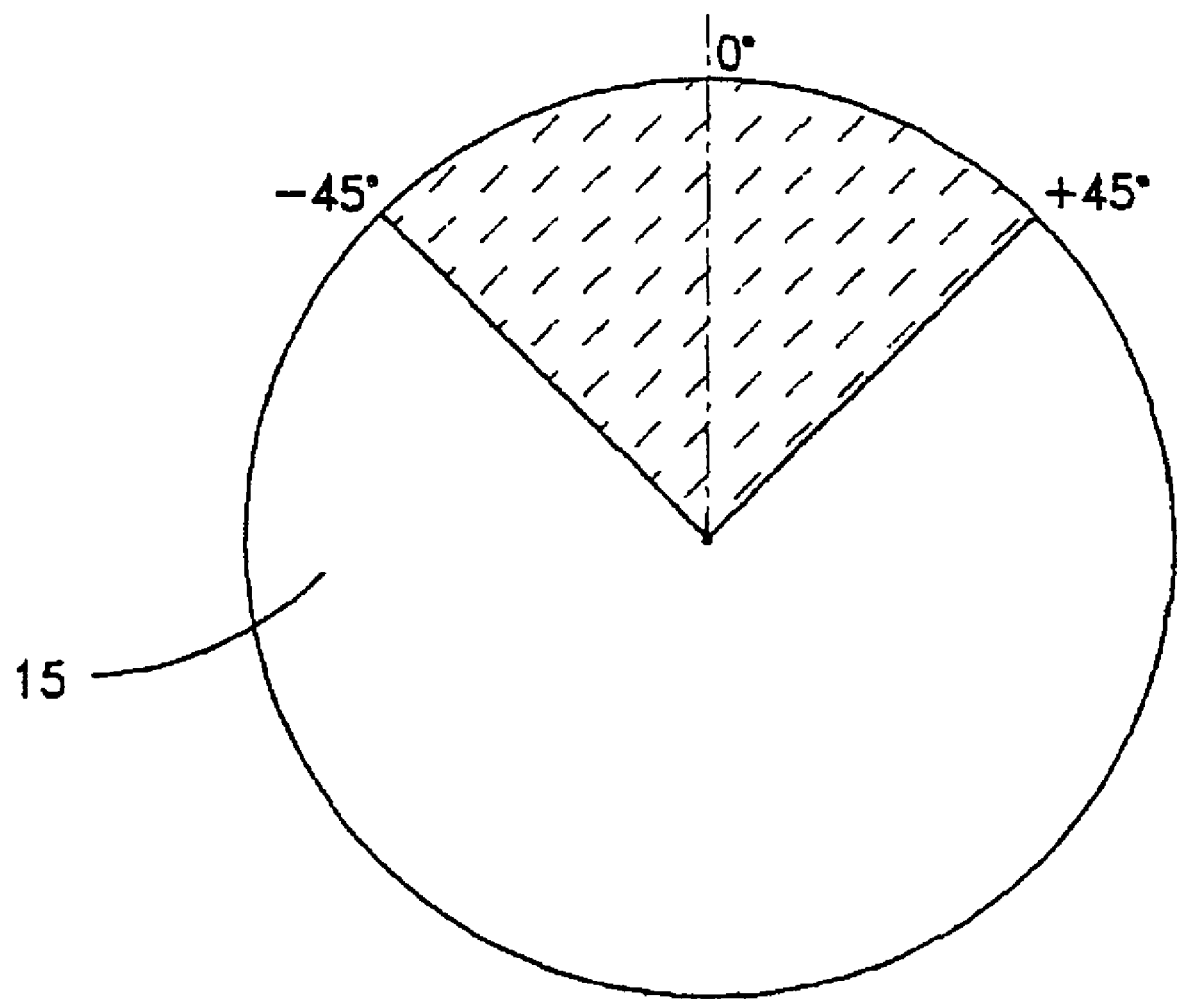
FIGS. 3a, 3b, 3c, and 3d show examples for camera unit field of views of nodes at different locations of the office.
Figure 3B:
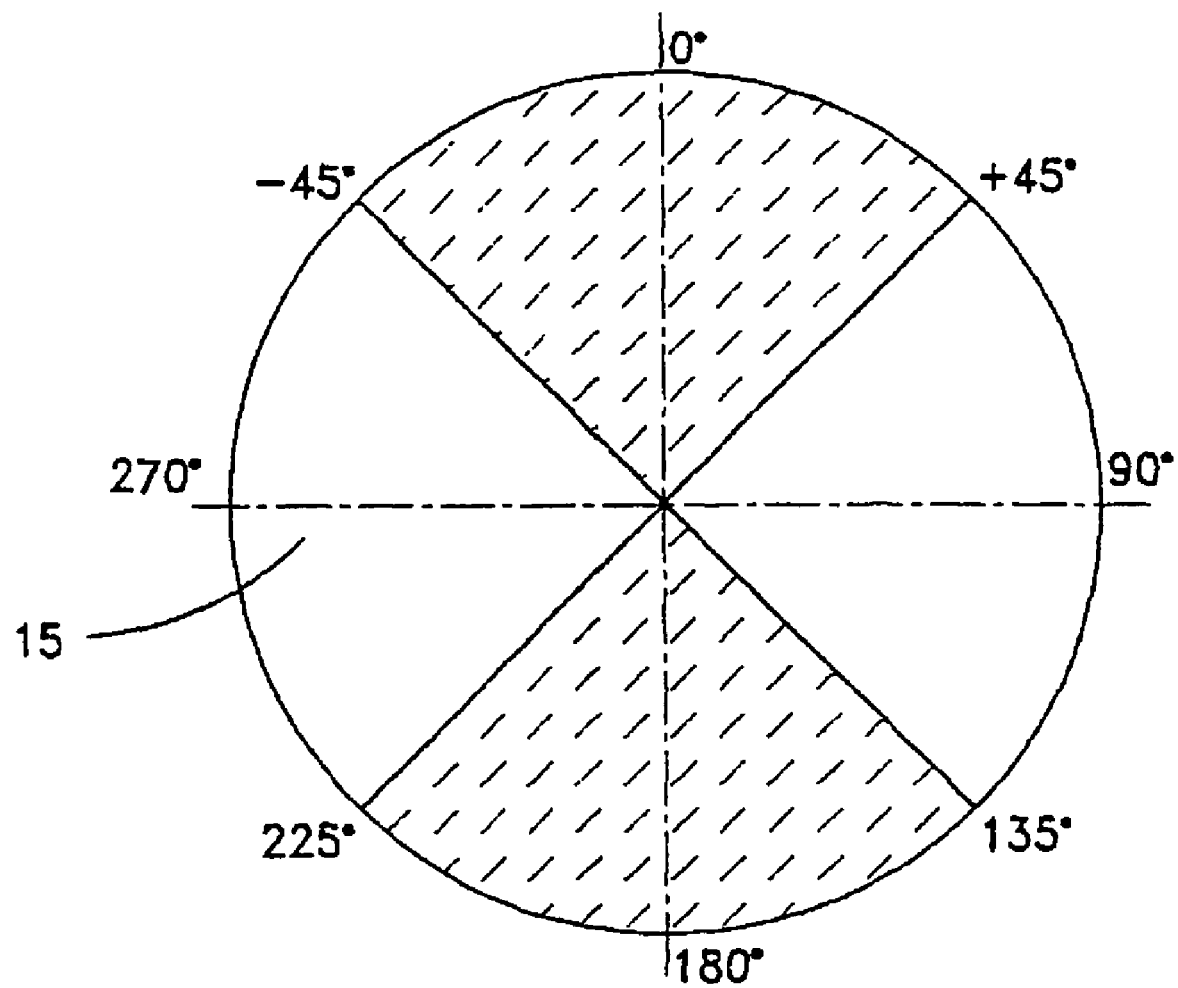

Before the filming stage, a plan is made regarding the routes along which the filming will be made. Along the planed routes, the nodes are created when the scanning apparatus pass a predefined distance D, which may be, for example, every 5-50 cm, or change its angular orientation by a predefined angle $\Delta°$ (for example 5°). For each node, a specific camera unit field of view is created. The term "camera unit field of view" defines herein the angular for each node, a cumulative field of views that are captured by the individual camera forming the camera unit. Several examples of nodes with their corresponding camera unit field of views are indicated in FIGS. 3a-3d. The shaded areas indicate the camera unit field of view. For example, as shown in FIG. 3a, the camera unit field of view in node 15 (and similarly also in nodes 16, 17, and 21) may span 90°, i.e., between −45° to +45° (while the 0° is defined as the North direction). The camera unit field of view of same nodes may alternatively be as shown in FIG. 3b, i.e., it may span two sectors, a first one between −45° to +45°, and a second one between 225° to 135° for enabling the user to "walk" both forward and backward.

Figure 3C:
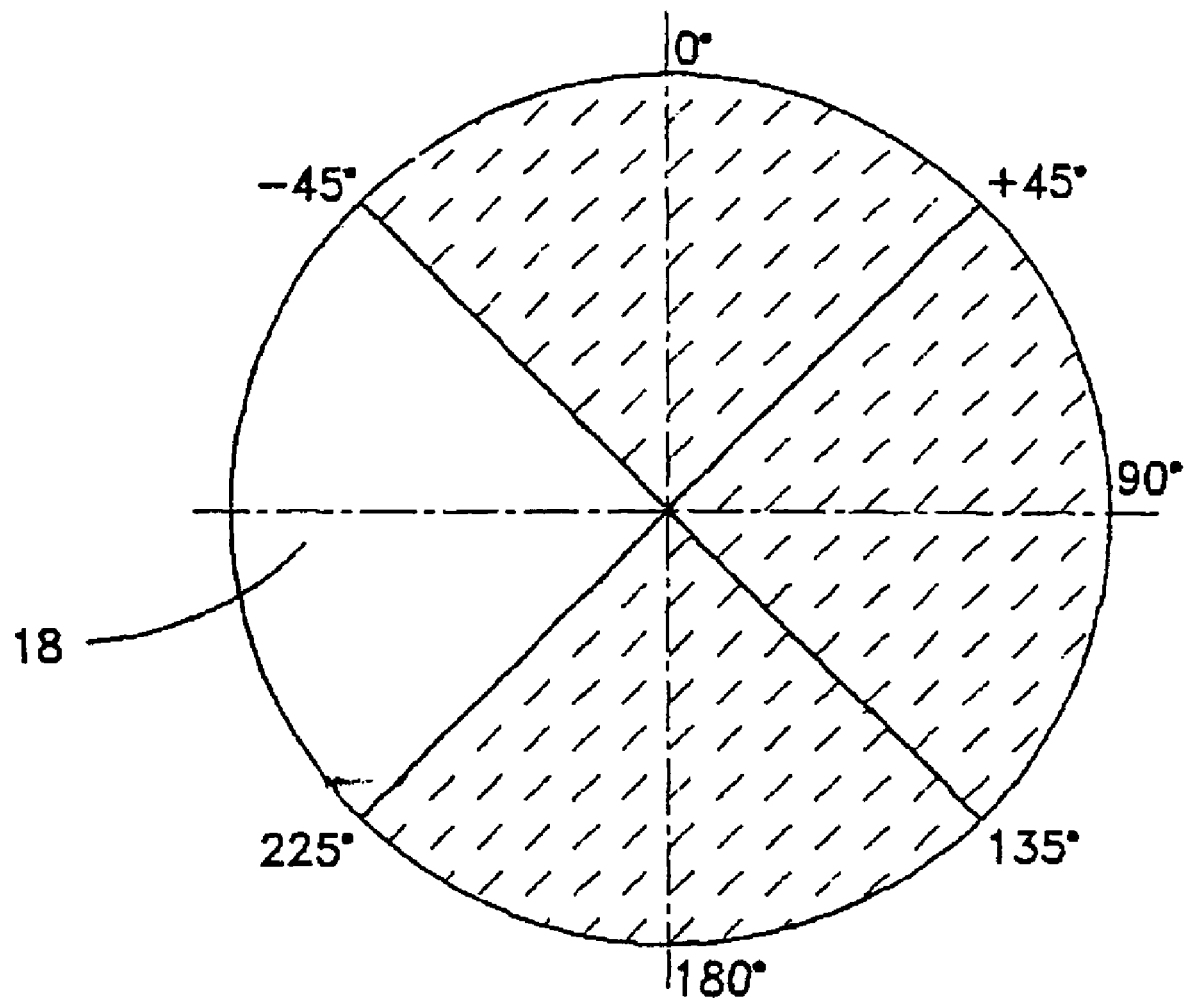
Figure 3D:
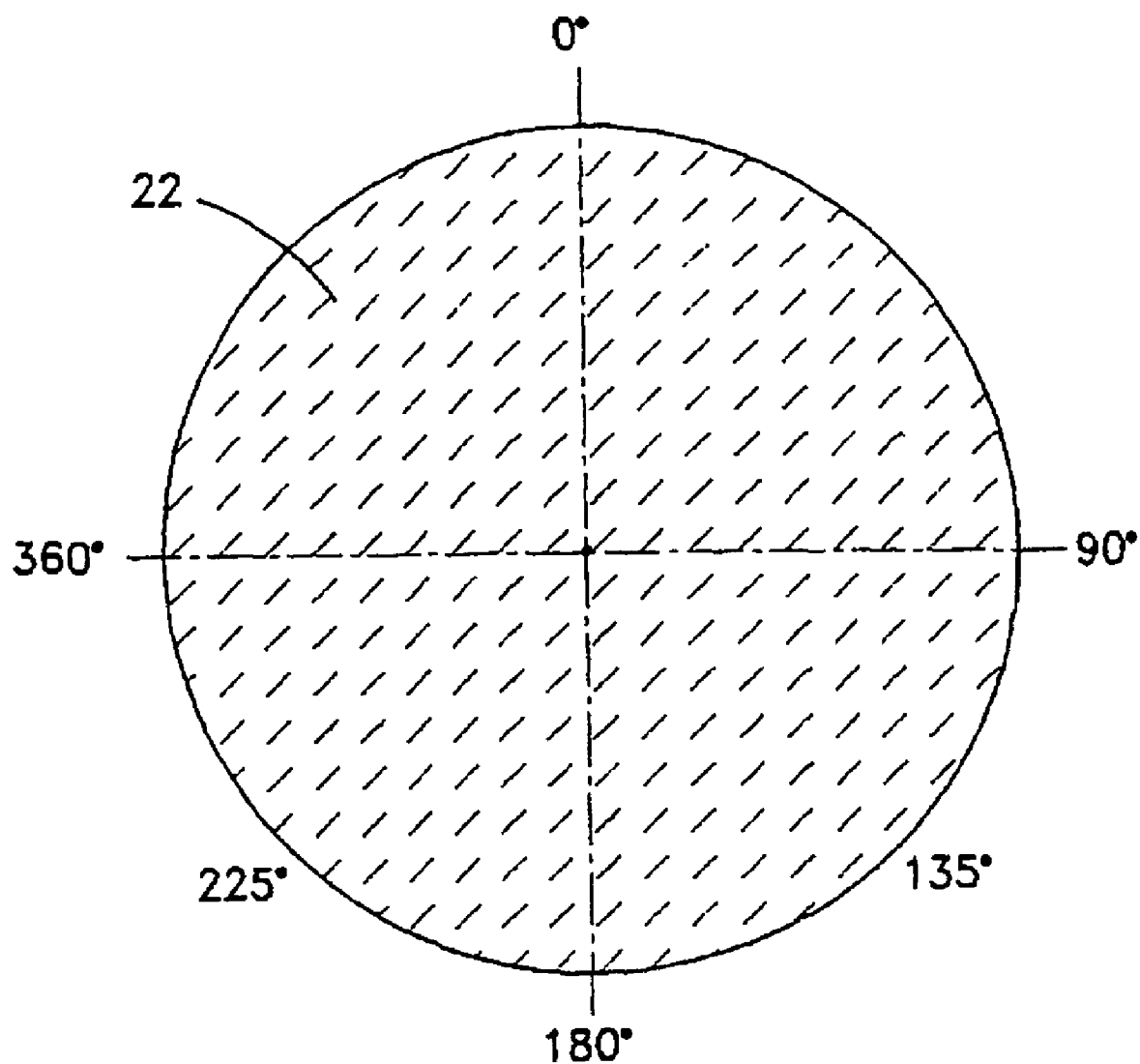

Such double field of view may be obtained in one filming session by mounting two separate cameras within the camera unit, one facing forward and a second facing backward on a same platform. FIG. 3c shows a preferable field of view for node 18 located at junction J1. In said node, the field of view spans a sector of 270°, i.e., between −45° to 225°. The field of view of node 22 may be 360°, as shown in FIG. 3d, in order to enable viewing of all directions.

Figure 4:
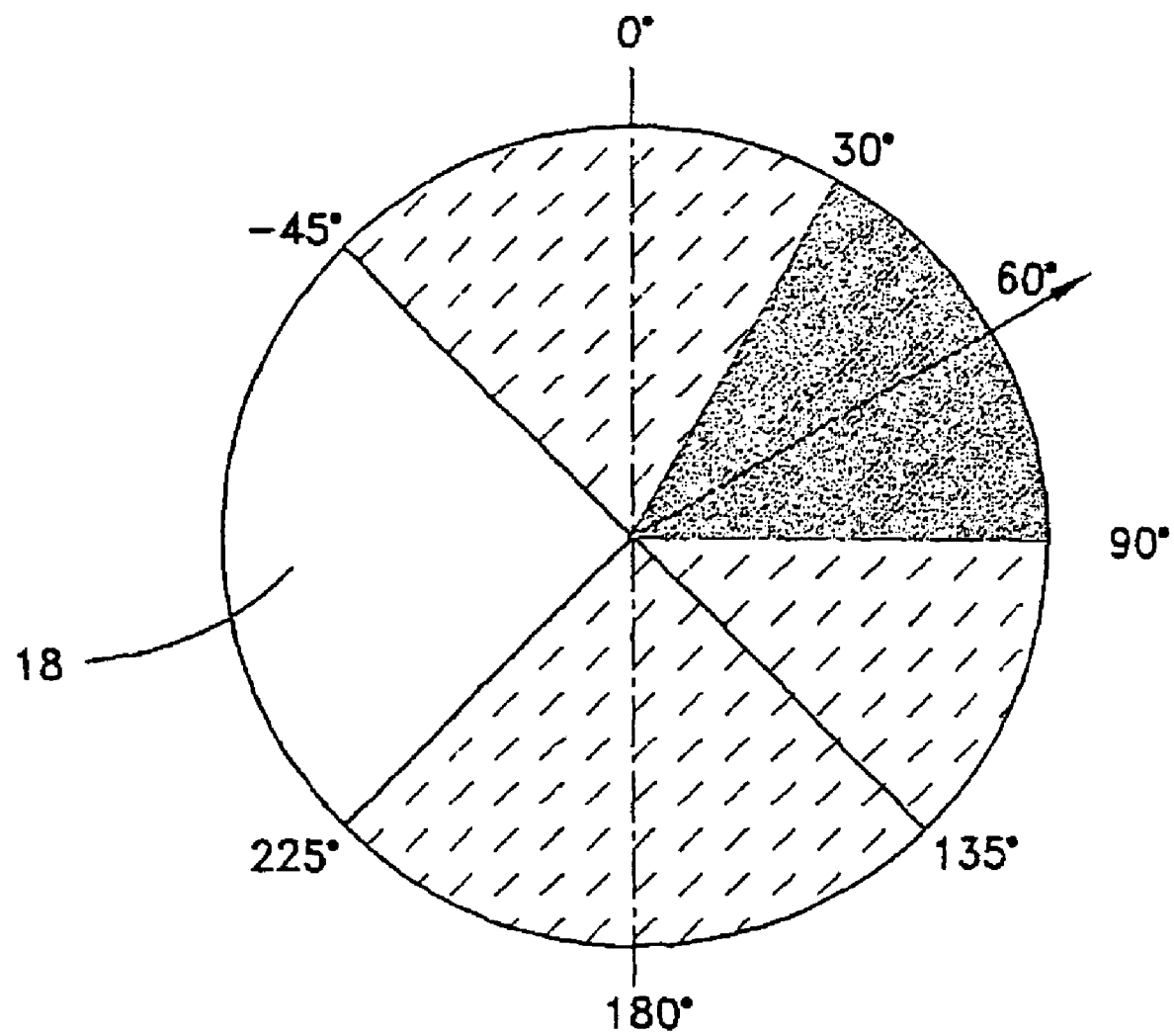
FIG. 4 shows a 60° user field of view (UFOV) which is positioned between 30° to 90° of a node having a camera unit field of view of (−45° to 225°)

Furthermore, the parameter of maximal user field of view (UFOV) is predefined. The user field of view is the angular size of a sector that the user is allowed to view while navigating. In any node, the user field of view must be smaller than the camera unit field of view, or if there are more than one sector within the node camera unit field of view, the user field of view must be smaller than any one of said camera unit field of view sectors. For example, the user field of view may be defined as a sector of 60°. Therefore, and as shown in FIG. 4, while located at node 18, the user, for example, may position his 60° user field of view at any range between −45° to 225°, for example between +30° to 90°. The user viewing direction always lies at the center of the UFOV, i.e., in this case the viewing direction is 60°.

After planning the routes, a distance D between nodes, a change in angular orientation Δ, a user field of view (which, as said, is a constant parameter), and a camera unit field of view for each node, the scanning apparatus is actually ready for carrying out recording of images.

Figure 5:
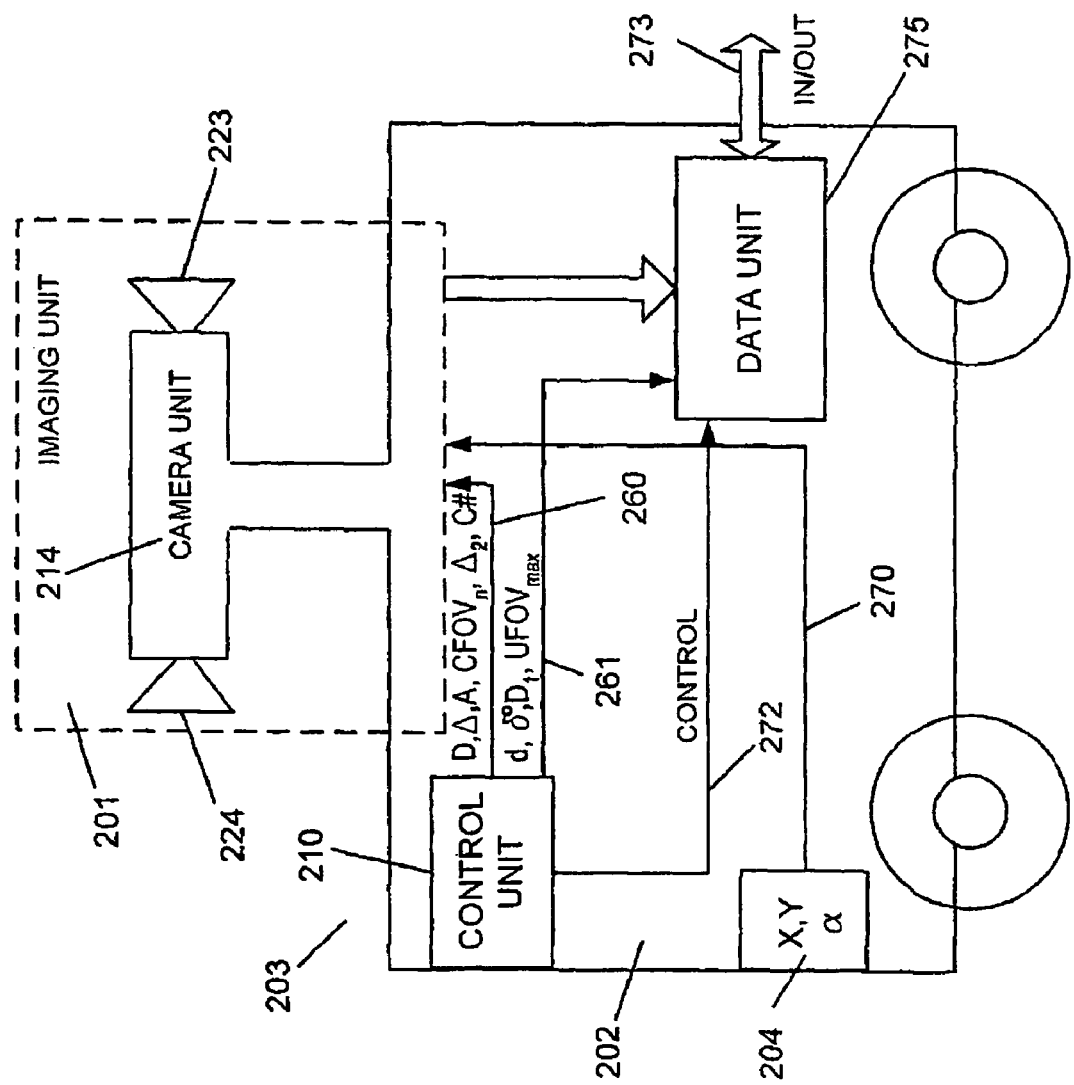
FIG. 5 illustrates in block diagram form the general structure of the scanning apparatus according to an embodiment of the invention.

The scanning apparatus 203 according to a preferred embodiment present invention is shown in FIG. 5, and comprises:
 a. A imaging unit 201;
 b. A moveable platform 202;
 c. Position and orientation sensors 204;
 d. Control unit 210; and
 e. Data unit 275.

The movable platform 202 is used for supporting the imaging unit 201, the control unit 210, and preferably the data unit 275 (the data unit 275 may in some embodiments be mounted away from the platform). The Position and orientation sensors 204 continuously provide to the imaging unit 201 the x,y absolute displacement of the platform, and its angular orientation ∝. The imaging unit 201 is also provided with the parameters, D, Δ, camera unit field of view, and activation signal A from the control unit.

The operator now has to ensure that at least the parameters D, and Δ, are stored in the apparatus. Then he has locate the scanning apparatus 203 at a reference (0,0) location, and start moving the platform and film along the routes. It should be noted herein that high accuracy is not a requirement in moving the platform along the planned routes, as while collecting the data by the apparatus, each specific node location and orientation is set, image data is associated, and the camera unit field of view is registered. More particularly, as said, new nodes are created when the apparatus passes a distance longer than D, or change its angular orientation by an angle larger than Δ. The said D, Δ, and other control parameters are supplied from the control unit 210 to the imaging unit 201 via control line 260. The other control parameters may include, activation/deactivation signal A, and a camera unit field of view necessary. The control unit 210 controls the imaging unit 201 at each node location.

The imaging unit 201 creates the nodes, associates with them all their related data including the visual data, and provides to the data unit 275 all the data related to each node.

The data unit 275 receives the data related with each specific node from the imaging unit, and processes the plurality of nodes in order to determine neighborhood and links between nodes, and save the resulted links in a database within the data unit 275. At any given time, the saved data in the database represents a virtual interactive movie based on all the nodes processed until that time. Furthermore, the said data stored in the database can be exported to another media, or such data may be similarly imported into the database, for example for updating purposes, through cannel 273. The import and export operations are controlled by signals 272 that are provided by the control unit 210.

Figure 7:
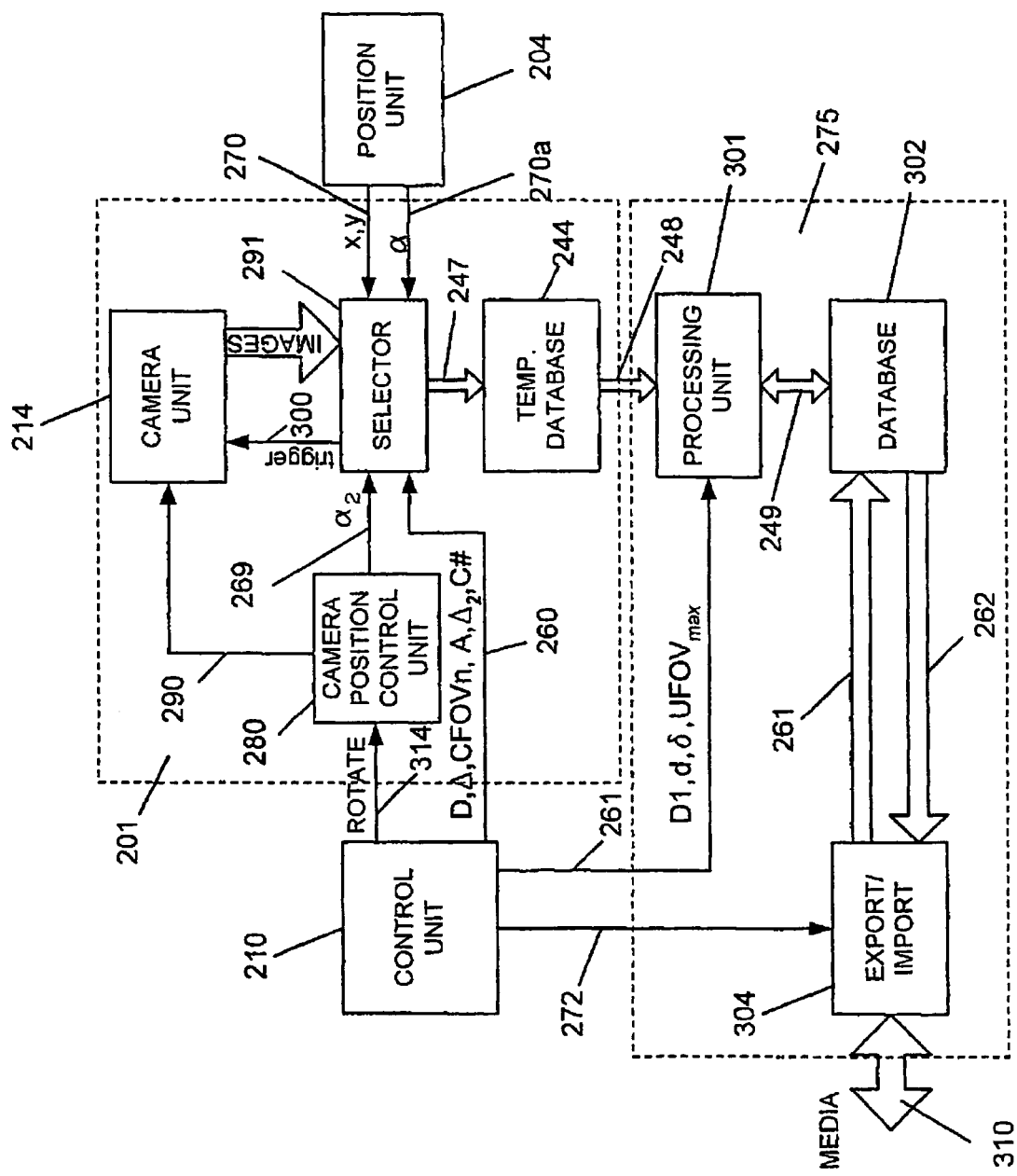
FIG. 7 is a block diagram illustrating in more detail the structure of the scanning apparatus according to an embodiment of the invention.

A more detailed block diagram of the scanning apparatus is shown in FIG. 7. The camera unit 214 comprises one or more cameras (for example two cameras 223 and 224 as shown in FIG. 5). During the filming process, the orientation of the camera unit 214 with respect to the platform 202 may be kept fixed, or may be adjustable by means of the camera position control unit 280 (which mechanically cause rotation 290 of the camera unit 214). In case of a camera that can obtain images in 360°, no such rotation of the camera unit 214 is needed (and in such a case, the unit 280 is not necessary). The angular orientation of the camera unit 214 with respect to the platform is given to the selector 291 from the camera position control unit 280 (signal 269 indicating the angle $\propto_2$). The camera unit 214 provides images to the selector 291 continuously or upon request by the selector, as indicated by trigger 300. The selector 291 creates new nodes based on signals 260, 270, and 270*a*. There may be two modes of operation for the selector 291, as follows:

a. During a static platform 202 position and orientation and rotating the camera unit 214 with respect to the platform 202.: In such a case the x,y coordinates and orientation ∝ of the platform 202 are fixed, and while the camera unit 214 is rotated with respect to the platform 202 ($\propto_2$ changes). The selector 291 creates a new node index based on the present coordinates. Then, the selector 291 captures an image or a part thereof every $\Delta_2°$ within the CFOVn. For example, if the CFOVn (the camera field of view for the node) is between 90° to 270°, and $\Delta_2°$ is 6°, we are using only one camera 223 of the camera unit, and the center of the field of view of this camera 223 is directed to 0°, the camera unit 214 will start rotating clockwise, and the selector 291 will ignore all image data coming from camera 223, until the left border of the camera 223 field of view is directed to 90°. Only thereafter the selector 291 will select an image data coming from camera 223 every 6° until the right border of the camera 223 field of view will direct to the 270° direction. The selector 291 associates the selected image data coming from camera 223 with the same node index as created. The selector 291 further associates with the node index and the image data the corresponding coordinates x,y, orientation ∝ of the platform 202, and the camera (for example, camera 223) field of view. The selector 291 finally transfers on channel 247 the data to temporary database 244.

b. The platform 202 moves, while the camera unit 214 orientation with respect to the platform 202 is fixed ($\propto_2$ is constant): The selector 291 creates a new node every (i) displacement D from the coordinates of the previous node; or (ii) Orientation change Δ of platform 202 with respect to the orientation of the platform 202 while selecting the previous node. The selector associates the current image data with the node index as created. The selector 291 further associates with the node index and the image data the corresponding coordinates x,y, orientation ∝ of the platform 202, and the camera unit field of view. The apparatus may operate in two different processing modes, as described hereinafter in FIGS. 8 and 9. For operating in the mode of FIG. 8, the selector 291 must associate with each node also a chain number indication C#, which arrives from the control unit 210. The selector 291 finally transfers on channel 247 the data to temporary database 244.

In items a and b above, the selector 291 may either select images from a continuous flow of images as obtained by the camera unit 214, or initiate an image request using trigger 300.

The positioning unit 204 senses at any time the coordinates x,y of the platform 202, and its angular orientation $\propto$.

The temporary database 244 forms as a temporary storage of the nodes data, and is used for storing such data, for example when the processing by the data unit 275 is performed off-line, or not in real-time.

The processing unit 301 retrieves data from the temporary database 244. Upon each retrieved node data, the processing unit 301 calculates neighborhood with respect to other nodes stored in database 302, and upon detection of neighborhood, it forms a link. The processing unit uses the parameter of maximal distance D1, the parameter of minimum distance d and the parameter of maximal allowed orientation change $\delta°$, and the maximal allowed user field of view (UFOVmax) (signal 261) for the calculation. The neighborhood calculation will be described in detail hereinafter. Upon completion of the neighborhood calculation, the node data and its associated links are stored via channel 249 in database 302. The import and export unit 304 is used for exporting linked data stored in the database 302 via channels 261 and 310, or importing such linked data via channels 262 and 310.

The control unit 210 comprises a user interface (not shown) which enables inputting of various parameters (such as D, D1 $\delta$, CFOVn, $\Delta$, d, $\Delta_2$, C#, etc.) and providing the same to the respective other units, displaying to the operator various data concerning the status of the scanning apparatus 203, and performing any general control of the apparatus 203. Among others, the control unit 210 enables control via line 272 of importing and exporting of linked data, selecting between two scan modes (fixed camera unit 214 or rotated) via line 214.

In order to assure the user a smooth view while progressing in the interactive movie, the following conditions should be maintained:

a. The distance between nodes should not exceed a predefined distance D;
b. While progressing by the user from one node to a next one while viewing the movie, assuring that the direction of the user field of view will not be forced to change by an amount larger than a maximal, predefined angle $\delta$; and
c. While assuring a change of field of view smaller than $\delta$ in progressing from one node to another (as indicated in item b), a full user field of view UFOV (as defined) will be available to the user.

Figure 6:
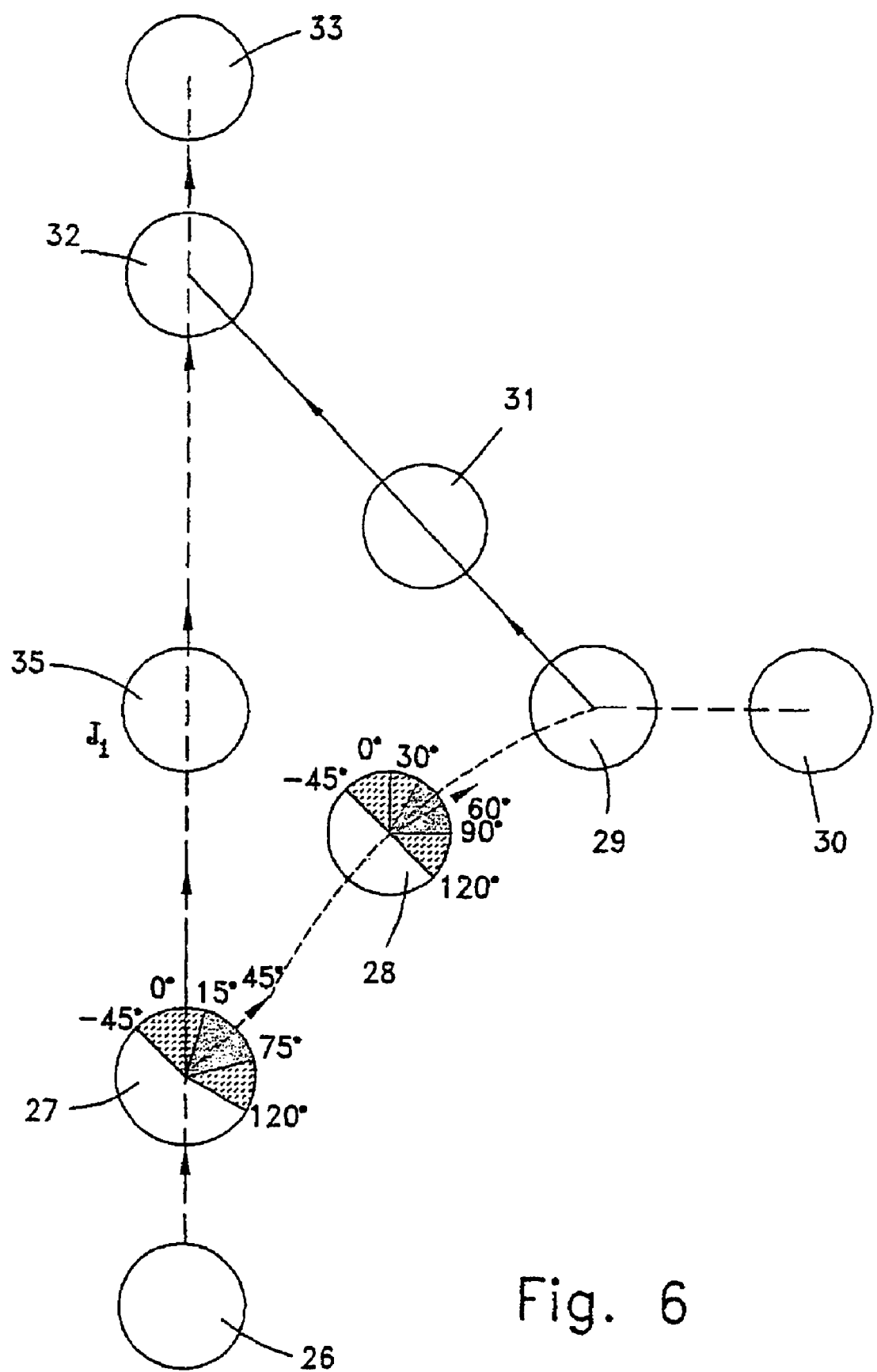
FIG. 6 shows an example for handling a moving between nodes in an area proximate to a junction.

In FIG. 2, the nodes within a junction have been drawn as forming a 90° junction. In order to better simulate a real case, the junction may be separated into two or more routes, as described in FIG. 6. More particularly, while reaching junction J1 in order to turn right to room B (FIG. 2), it is more close to real that the user may start turning to the right at node 27, in an angle of about 45°. Therefore, if for example, the camera field of view of node 27 is 165° as shown, and the user maximal field of view is defined as 60°, it is logical that after moving from node 26 to node 27 the user will first turn his looking to the 45° direction with user field of view set between 15° to 75°. In entering node 28, it is then logical that the user will turn his looking direction further to the right, i.e., to about the 60° direction, i.e., his field of view will span angles of between 30° to 90° as shown in FIG. 6. The exit direction (i.e., the view direction to which the user looks while leaving a node to a next one) from a node to a next one is also registered in the database 302, and the entrance direction to the next node (i.e., the view direction to which the user looks while entering a node from a previous one) is also registered in the database 302. Of course, there may be more than one exit from a node and more than one entry into a node. In the example of FIG. 6, node 32 has two entries, one from node 31 pointing to about the −30° direction, and a second entry from node 35, pointing to about the 0° direction. According to an embodiment of the present invention the entry and exit directions to or from nodes respectively may be those as determined by the orientation of the platform 202 while entering or exiting the node. More particularly, as said the positioning unit 204 of apparatus 203 is provided with direction means (such as gimbals) that measure at any given time the orientation of platform 202. Alternatively, the direction may be calculated from the displacement vector as also obtained from positioning unit 204. As said before, it should be noted, that in order to assure a smooth viewing of the interactive movie the difference between an exit direction from a first node and an entry direction to a next node should not exceed a predefined value $\delta°$. Furthermore, while maintaining the said difference less than $\delta°$, and while positioning the user field of view at the said next node, the system should ensure the providing of a full span of the maximal user field of view as defined. For example in the case of FIG. 6, if the entry direction to node 28 is 60°, i.e., a user field of view spans an angle between 30° to 90°, the camera field of view of node 28 should span at least the sector between 30° to 90°, and generally much more than that in order to enable the user varying his field of view direction.

While accumulating the data of the nodes (i.e., all the data associated with the node) the connections (links) between nodes have to be established. More particularly, the valid paths between nodes have to be determined, together with the entry and exit directions. For example, in FIG. 6 it is clear that node 26 is connected to node 27, as a "jump" from node 26 to node 27 can be made, while such a jump cannot be made, for example, from node 26 to node 28. Nodes 26 and 27 are therefore defined as "neighbors". Likewise, nodes 28 and 35 are neighbors of node 27. The processing unit 301 establishes the neighborhood of nodes. Neighborhood of nodes according to the invention involves saving the direction to the other neighboring node (entry or exit), and the identification of the said other neighboring node.

Figure 9:
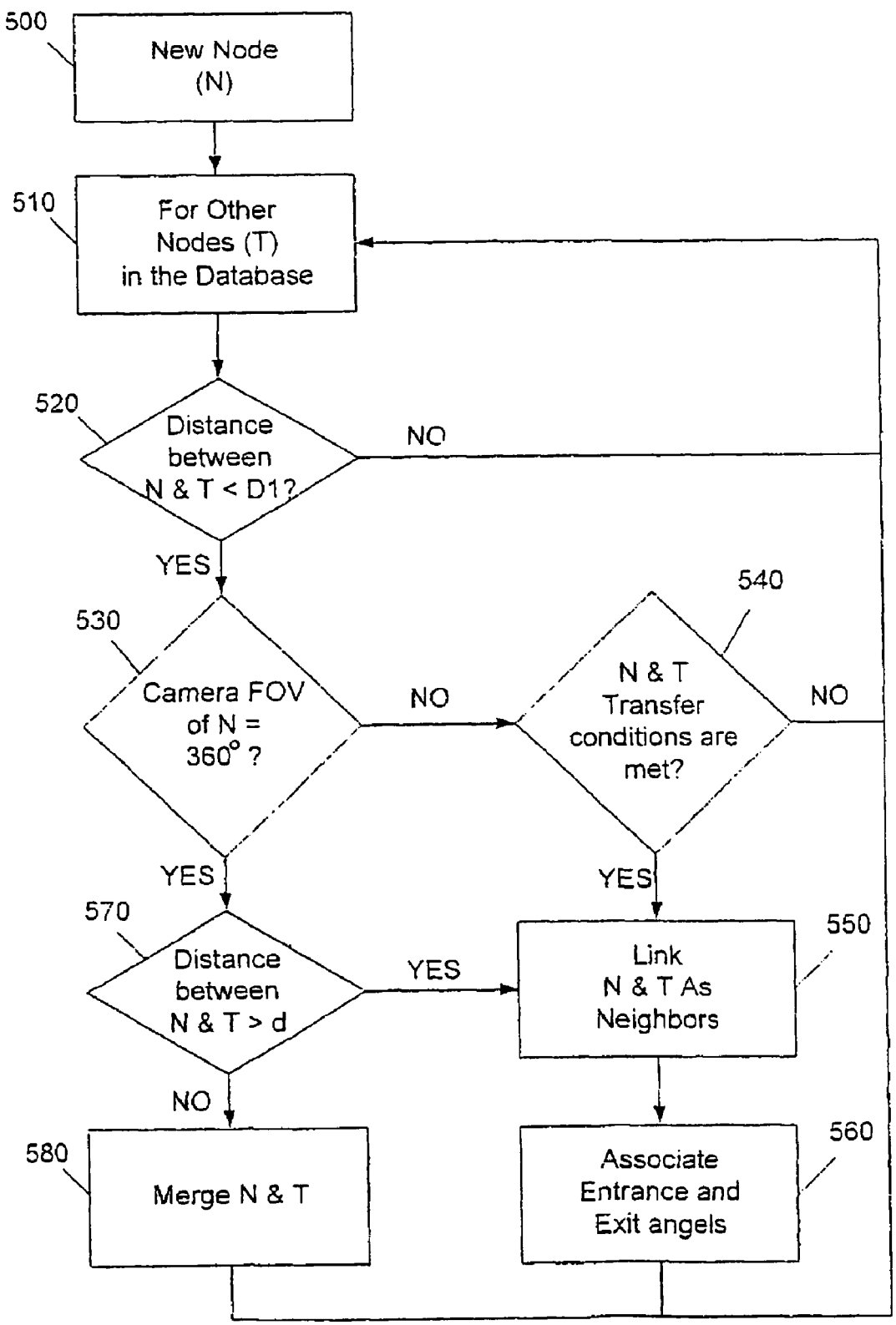
FIG. 9 is a more detailed flow diagram illustrating how the nodes are analyzed for neighborhood according to another embodiment of the invention.

FIG. 9 describes in detail a process for determining neighborhood of nodes. In step 500 a new node N is obtained into storage N, for example this may be a new node just recorded by the camera. For other nodes in the data base that are sequentially brought to storage (T) in step 510, their coordinates are verified in step 520 to check whether they are close enough (below predefined upper limit distance D1). If the answer is Yes, and the new node in N has a 360° field of view (step 530) and the distance between N and T is smaller than another defined, lower distance limit d (No in step 570), the nodes in N and T can be merged into one node of 360°. If, however, the field of view of N is not 360° (step 530), then the camera fields of view of N and T are checked whether the following two conditions are met: (a) a step from N into T requires a change in user field of view (UFOV) direction smaller than $\delta°$; and (b) whether in that case a full maximal user field of view (UFOVmax) as defined can be provided (in our example 60°). If the answer is Yes to both said conditions, the nodes of N and T can be linked (step 550), and their entry and exit directions are also associated (step 560). If, however, in step 540 the answer is No, the two nodes cannot be linked. If in step 570 the answer is Yes, the two nodes can be linked (step 550).

Another way of constructing the scheme is to track the linear route of apparatus 203 while collecting the data. Tracking the linear route of the apparatus 203 can provide a way to determine when two routes of the apparatus 203 cross. The recognition of a cross can be used to define the node as a junction node and to expand its neighboring list.

Figure 10:
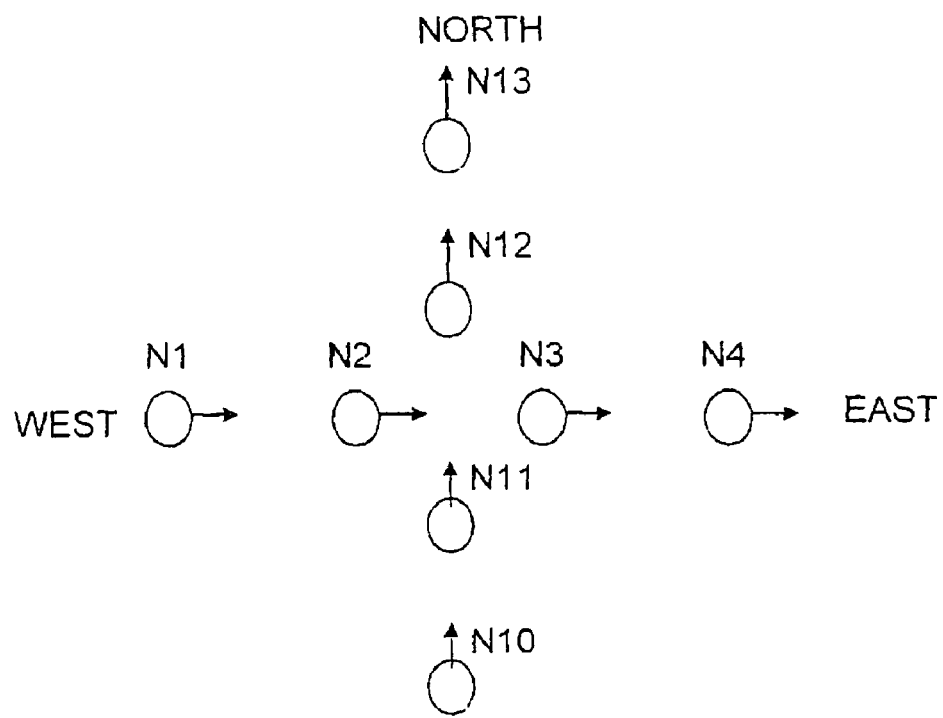
FIGS. 10 and 11 are two examples illustrating the analysis of nodes in proximity of a junction.
Figure 11:
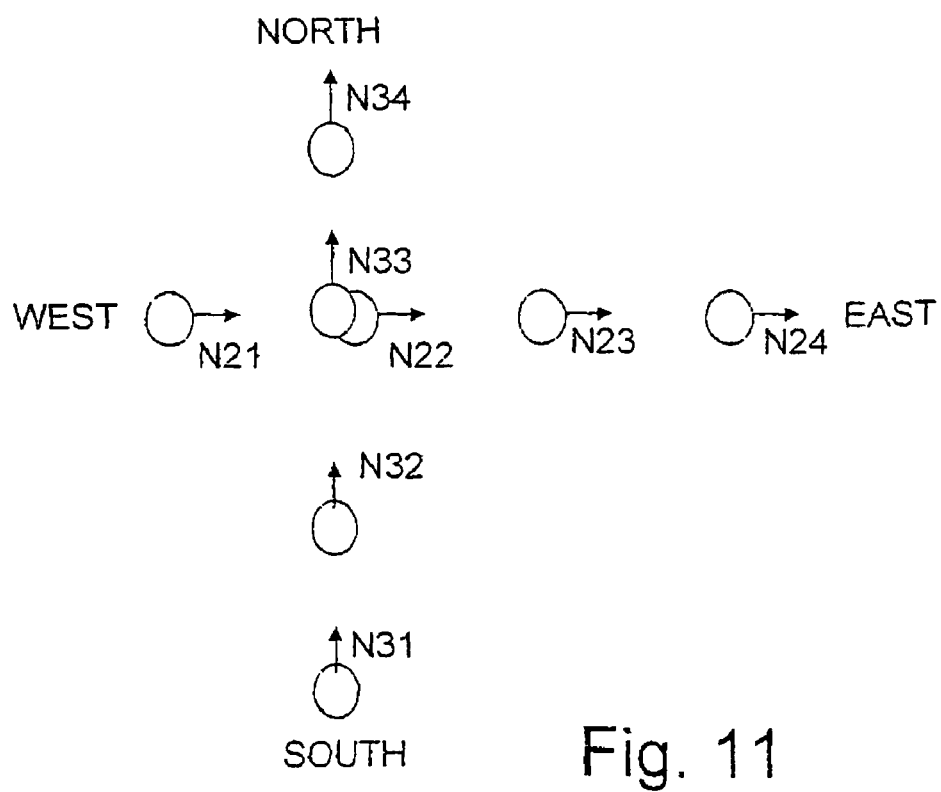

FIG. 10 describes two chains of nodes, each having a different route. Nodes N1 to N4 are the nodes recorded while the apparatus 203 has traveled to the "East" and N11 to N13 are the nodes recorded while apparatus has traveled to the "North". In this example the N1 to N4 route was recorded first, it already exists in the data base and the procedure has just finished connecting N11 to N10 as neighbors. Receiving N12 into the procedure will connect N12 to N11 as neighbors too. Yet, the neighborhood test will indicate that there is a crossover that should receive a special treatment, as follows:

1. Can N2 & N3 be connected as N11 neighbors?
2. In case the field of view is 360°, and the distance between them is below distance D1, but above d, they are defined as neighbors (see steps 520, 530, 570 in FIG. 9)
3. In case the field of view is smaller than 360°, for example, 180°, the two transfer conditions are checked (step 540) and if met, a link is established (step 550);

FIG. 11 describes two chains of nodes, each chain belongs to a different route. N21 to N24 are the nodes recorded while the apparatus 203 traveled to "East" and N31 to N34 are the nodes recorded while the apparatus 203 traveled to "North". In this example the N21 to N24 route was recorded first, already exists in the scheme, and the procedure has just finished connecting N31 to N30 (not shown) as neighbors. Receiving N32 into the procedure will connect N32 to N31 as neighbors too. Yet, the neighborhood test will indicate that there is a crossover that should receive a special treatment, as follows:

1. Should N21 & N22 be connected as N31 neighbors?;
2. In this example, N21 is located at a distance above the maximal range D1 from N31, and therefore it is not a neighbor of N31;
3. In case the field of view of both nodes is 360°, and N33 and N22 are within the minimal range, i.e., less than d, then they are merged to one node, having a camera field of view of 360°, and the link directions are united; More particularly, deleting N33 and making N23 and N34 as N22 neighbors (Yes in steps 520, and 530, No for step 570).

As said, the invention assumes that the virtual movie is a collection of image data that are captured along routes within the physical site. This is translated in the present invention to a linked graph of nodes in which every node comprises an image data that represents a camera unit field of view. The connection from one node to another (i.e., from a selected user field of view UFOV in a first node to another UFOV in another node) is maintained smooth. The links between nodes allow movement from one node to another in a smooth manner. The filming, as well as the forming of nodes and their links can be established in real time, and in that case, at the end of the filming and processing, the movie is essentially ready for use. Thereafter, when the movie is activated, the user may "move" from a first node, viewing a selected view sector, to a second node viewing another view sector, however in closeness enough to maintain smoothness of view. The "moving" of the user from one node to a next node is performed by directing the center of the user field of view to an exit direction of the present node, and advancing to the node linked to said present node by said exit. The entry of the user to said next node is made by showing to the user the user field of view (portion of the next node image data) when the center of the user field of view points to the entry direction of said next node.

Furthermore, some animation may be added to selected image data that is then displayed to the user. Also, elements existing within the image data displayed to the user (including animation elements) may be made interactive, and may cause events. On the other hand, there may be some events that will initiate animation or other events. Therefore, the interactive movie of the present invention is an ideal for simulation.

Figure 8:
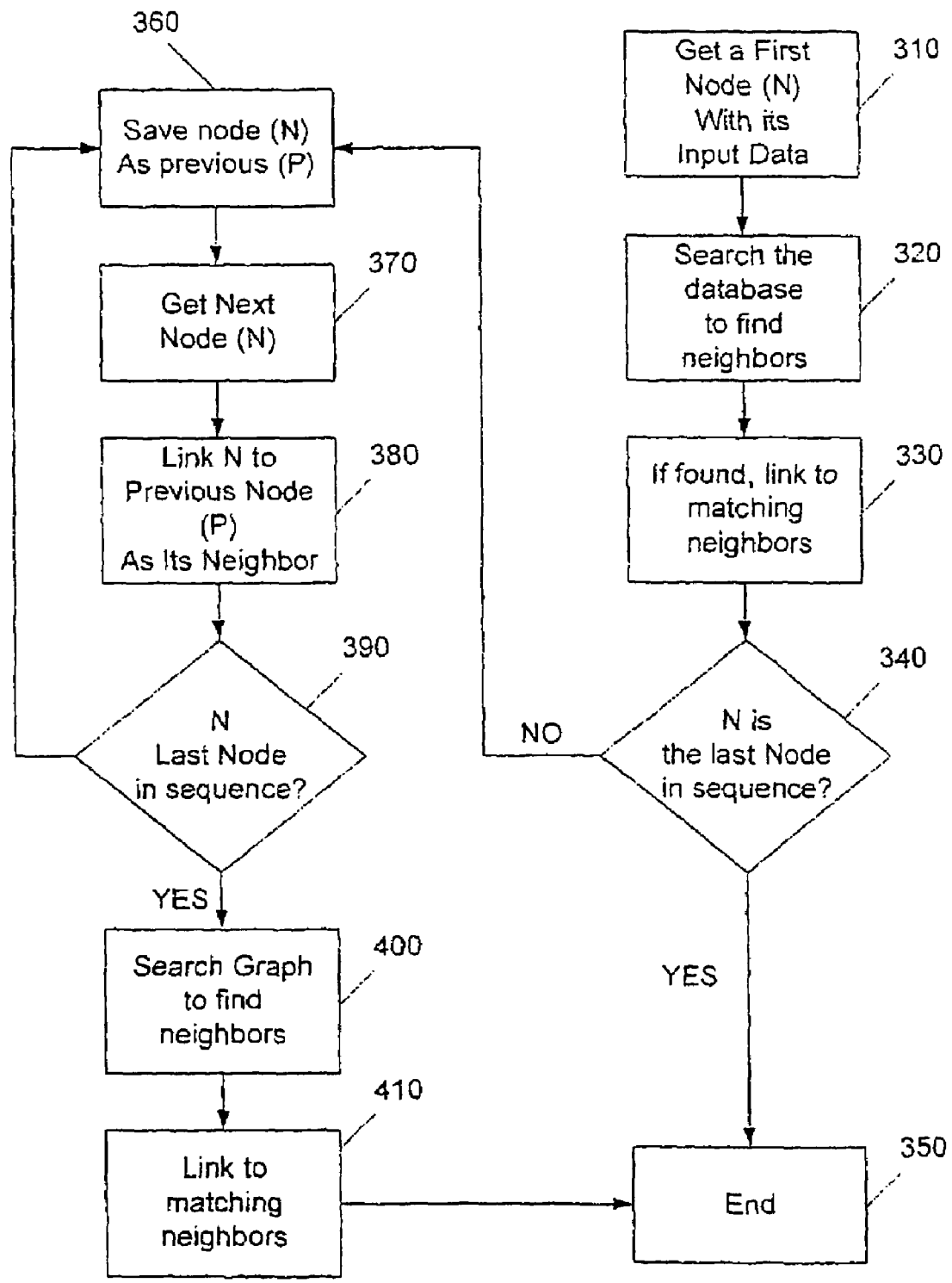
FIG. 8 is a flow diagram illustrating how the nodes are analyzed for neighborhood according to one embodiment of the invention.

The procedures as described above in FIGS. 10, 11, and 12 can generally handle all the situations. FIG. 8 provides an alternative procedure in which fewer calculations are made, however some possible links between nodes may not be recognized, but from the user point of view, the effect may not be significant. According to this procedure, the apparatus obtains along routes a collection of nodes that are linked like a chain, wherein only the first node and last node of said chain a checked for possible linking with the existing linked graph in the database. Nodes that are considered to belong to a same chain have a same C#. In step 310, a first node of a chain is selected. In step 320, verification with respect to the linked graph is made in order to find whether neighborhood can be established. If the conditions for linking with another node in the graph are met, in step 330 a link is established. In step 340 a check is made to find whether the present node is the last in the chain. If the answer is Yes, the procedure ends. If, however, the answer is now, in step 360 the first node is put in a "previous" storage (P), and in step 370 a next node is obtained and a link is made in step 380 between the nodes N and node P. In step 390, verification is made whether the node N is the last node in the chain. If the answer is Yes, we again search within the linked graph to find neighbors, and if found, a link is made in step 410, and the procedure ends (350). If, however, the answer in step 390 is No, the procedure returns to step 360.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method for producing an interactive virtual movie, which simulates the walking of a user within a real site and exploring the same, comprising:
   a. Defining first minimal conditions for the creation of a new node;
   b. Defining second minimal conditions for linking between nodes;
   c. Moving a scanning apparatus along routes within the site, measuring the x,y, displacement coordinates, and angular orientation of the scanning apparatus at any given time, and creating a new node at least whenever such first minimal conditions are met;
   d. Obtaining an image data at each node location reflecting a camera unit field of view, and associating the said image data and its orientation with the x,y, location coordinates of the node;
   e. Finding and registering neighborhood links between pairs of nodes to generally create chains of nodes, each link assignment connecting between any two nodes satisfies at least said second minimal conditions required for linking between nodes, wherein more than one link may be assigned to a node;

f. Further associating and registering with each created link an exit angular orientation from a first node in the pair and entry angular orientation to the second node in the pair;

wherein one of said first minimal conditions is a maximal predefined displacement D between two nodes sampled by the apparatus.

2. Method according to claim 1 wherein satisfying any one of the conditions included in said first minimal conditions will result in the creation of a new node.

3. Method according to claim 1 wherein one of said first minimal conditions is a maximal predefined allowed angular change δ° in the orientation of the apparatus after leaving a node.

4. Method according to claim 1 further comprising elimination or merging of nodes when some third conditions are met.

5. Method according to claim 4 wherein said third conditions comprise closeness of nodes below a predefined distance d, and a 360° in at least one of the nodes.

6. Method according to claim 1 wherein each image data comprises a plurality of frames, and wherein each frame angular orientation is also registered.

7. Method according to claim 1, wherein said interactive virtual movie comprises:
 a. A plurality of nodes;
 b. Links connecting between nodes, wherein with each link between two nodes is associated with an exit angular indication from one node, and an entry angular indication to the other node, plurality of links may be associated with one node;
 c. Image data reflecting a camera unit field of view for each node, and orientation indications for said image data.

8. A virtual interactive movie according to claim 7, wherein the display of the movie comprises the steps of:
 a. Providing to the user with means for selecting, turning, and advancing;
 b. Displaying to the user a selected user field of view within the image data of a node;
 c. When the user turns to a specific direction, displaying to the user the user the field of view portion of the image data which corresponds to said specific direction or close to it;
 d. When the user directs to one of the exit directions of the present node, and chooses to advance: displaying to the user a portion of the image data of the next node linked to said present node by said exit direction, said displayed portion of the image data corresponds to the entry direction associated with said link;
 e. When the user selecting a node other than the present node, displaying to him a user field of view portion of the image data of said other node.

9. Apparatus for producing an interactive virtual movie, which simulates the walking of a user within a real site, comprising:
 a. A movable platform;
 b. Position and orientation unit for obtaining at any given time position and orientation of the platform, and providing the same to an imaging unit;
 c. Imaging units for creating a node any time when some first minimal conditions are met, obtaining image data, and associating said image data and its orientation with the node location, thereby forming a node package;
 d. Data unit for:
  1) receiving node packages from the imaging unit;
  2) calculating neighborhood between nodes;
  3) registering links between found neighboring nodes, including registering for each link entry and exit directions to and from nodes;
  4) calculating possible merging and/or eliminating of nodes;
  5) saving in a database within the data unit a linked graph which is the result of steps 1-4;
  6) importing linked graphs from removable media or network device to the database; and
  7) exporting linked graphs from the database to a removable media or a network device.
 e. A control unit for:
  1) Activation and deactivation of the device;
  2) Defining parameters necessary for the operation of the apparatus;
  3) Providing control over the import and export operations;
  4) Monitoring and coordinating the operation of the various units and elements of the apparatus.

10. Apparatus according to claim 9, wherein the data unit is located on the movable platform.

11. Apparatus according to claim 9, wherein the data unit is located away from the platform.

12. Apparatus according to claim 9, wherein the imaging unit comprises of one or more cameras.

13. Apparatus according to claim 12, further comprising mechanism for rotating the cameras, for positioning the cameras, or both for rotating and positioning the cameras.

14. Apparatus according to claim 13, further comprising sensors for measuring the orientation of the cameras with respect to the platform.

15. Apparatus according to claim 9, wherein said first minimal conditions comprise at least the parameter of a maximal predefined displacement D between two nodes as measured by the position and orientation unit.

* * * * *